United States Patent [19]

Bigelow et al.

[11] 3,873,761

[45] Mar. 25, 1975

[54] MULTIPLE SCANNING HEAD FACSIMILE SYSTEM

[75] Inventors: John E. Bigelow, Clifton Park, N.Y.; Paul A. Dodge, San Antonio, Tex.

[73] Assignee: General Electric Company, Schenectady, N.Y.

[22] Filed: June 14, 1973

[21] Appl. No.: 369,849

[52] U.S. Cl. .................. 178/6, 178/7.6, 178/DIG. 3, 178/6.6 HS

[51] Int. Cl. .................. H04n 1/12

[58] Field of Search ...... 178/7.6, 6, 6.6 HS, 6.6 DD, 178/DIG. 3

[56] References Cited

UNITED STATES PATENTS 3,448,207 6/1969 Green .................. 178/6

3,670,099 6/1972 Oliver .................. 178/6

*Primary Examiner*—Robert L. Griffin
*Assistant Examiner*—Edward L. Coles
*Attorney, Agent, or Firm*—Paul F. Wille; Joseph T. Cohen; Jerome C. Squillaro

[57] ABSTRACT

A multiple scanning head fascimile system is disclosed in which a plurality of collinear sense heads, attached to a rotating member, scan a document line by line. Logic circuitry, containing temporary storage of the detection of information by each sense head, enables blank spaces and/or blank lines to be skipped, thereby producing an output signal bearing only information. The printer mechanism comprising a plurality of printer heads, decodes the output signal to actuate the printer head corresponding to the sense head selected by the logic circuitry.

10 Claims, 6 Drawing Figures

PATENTED MAR 25 1975

3,873,761

SHEET 2 OF 4

MULTIPLE SCANNING HEAD FACSIMILE SYSTEM

This invention relates to facsimile systems and, in particular, to facsimile systems with provision for skipping white spaces in the material being copied.

Presently used facsimile systems generally scan all of the area of the input material with an optical system that discriminates between light and dark. The optical system scans a small area with what is known as a resolution element. The number of resolution elements scanned per second is compatible with the bits per second bandwidth capability of the communication link.

Transmitting a typical typewritten page with facsimile equipment requires approximately one hundred times the number of bits required if the characters were sent in code. Stated another way, the transmission time is about one hundred times longer for facsimile.

Yet, facsimile has an advantage in that it can transmit any sort of information, e.g., handwriting and figures, not just typewriter characters. Further, facsimile equipment does this with relatively simple equipment.

There is a need, however, for facsimile equipment that retains the advantage of relative simplicity, yet requires less costly and inefficient communication methods.

Some attempts have been made in the prior art at reducing the communication time required. One approach has been to enable the facsimile system to scan blank areas more rapidly than information containing areas. To implement this type of operation, it has generally been necessary to use some non-mechanical scanning element that would permit high speed, random control of the resolution element. However, while economies in communication are obtained, the simplicity of the system is lost. Another approach has been to rapidly scan the material to find the location of blank spaces. This information is stored and used to guide a slow scanning element past blank spaces. This also greatly increases the complexity of the system.

In view of the foregoing, it is therefore an object of the present invention to provide an improved facsimile system.

Another object of the present invention is to provide an improved facsimile system requiring fewer bits of information and less transmission time.

A further object of the present invention is to provide an improved facsimile system wherein blank spaces in the material being copied are skipped without mechanical speed variations.

Another object of the present invention is to provide an improved facsimile system without materially increasing the complexity of the facsimile system.

The foregoing objects are achieved in the present invention wherein mechanical scanning is combined with look-ahead electronics to provide a skipping of blank spaces and a readout of only the information bearing areas. Specifically, a plurality of revolving optical scanning heads scan in a line across the material to be reproduced. Non-scanning sense and logic circuitry detect whether or not a given head senses information and, if not, proceeds to the next head that senses information. Once information is detected by a scanning head, the information is coupled to an output terminal with an indication of the identity of the proper head to select.

A more complete understanding of the present invention can be obtained by considering the following detailed description in conjunction with the accompanying drawings, in which.

Figure 1:
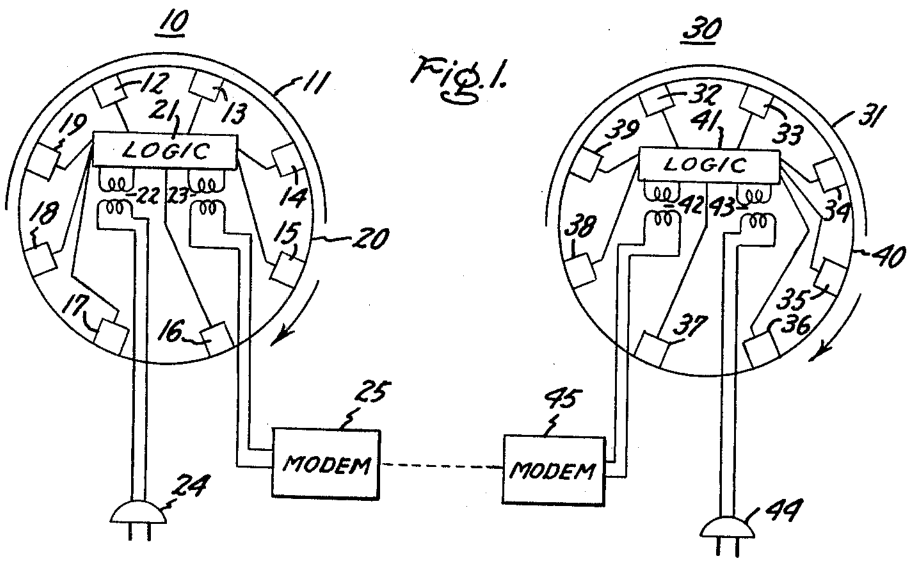
FIG. 1 illustrates a facsimile system in accordance with the present invention.

FIG. 1 illustrates a preferred embodiment of the facsimile system of the present invention comprising a scanner 10 and a printer 30. A sheet of paper 11 containing information to be duplicated is curved to form a cylindrical surface overlying approximately half of drum 20. Drum 20 contains a plurality of collinear optical detectors or sense heads 12–19, spaced at regular intervals about the periphery thereof. The number of optical detectors utilized is not critical and the number may vary from about four to 24 detectors. Fewer than four detectors does not produce sufficient time saving, while greater than about 24 detectors unduly increases the complexity of the system. For the sake of illustration only, it is assumed that eight detectors are being used.

Sense heads 12–19 are connected to logic circuit 21 which is coupled to the outside world by two rotating transformers 22 and 23. Transformer 22 provides power from source 24 to the logic circuit, while rotating transformer 23 couples the output signal from the detectors to modem 25, from which the data is transmitted by way of suitable communication link to modem 25 at the location of printer 30.

Printer 30 is similar in construction to detector 10 in that a blank page 31 is formed into a cylindrical surface covering approximately half of the surface of printing drum 40. Printing heads 32–39 are spaced at regular intervals about the periphery of drum 40 and are actuated by logic circuit 41 under the control of signals from rotating transformer 42 and modem 45. Suitable power is provided to logic circuit 41 by way of rotating transformer 43 and power source 44. The use of rotating transformers for logic circuits 21 and 41 reduces the complexities of the system by eliminating commutation problems. Integrated circuit logic, used for circuits 21 and 41, easily fits within drums 20 and 40.

Drums 20 and 40 are turned by synchronous motors that may also be driven by power sources 24 and 44 respectively. Further, it is desirable that an indexing mechanism be included in the drive of drums 20 and 40 so that for initial conditions a particular head in scanner 10 and printer 30, for example, heads 12 and 32 respectively, be located at a particular point at the start of each transmission. Suitable driving and indexing mechanisms are well known in the art and form no part of the present invention. Similarly, suitable drive mechanisms for advancing the rotating drum in a direction perpendicular to the plane of the drawing as each line is scanned are well known in the art.

In operation, the material to be copied is inserted as a cylindrical surface about the perimeter of drum 20. As noted above, the initial condition requires that head 12 start from a particular point on the page, for example the upper left-hand corner. As detector 12 scans the page, the information sensed thereby, in the form of changes in reflectance of the page, is routed by logic circuit 21 to modem 25 and then to printer 30.

During the interval in which head 12 scans out the first quarter of page 11, detector 13 is monitored by logic 21. This enables logic 21 to look ahead on the page and determine whether or not information exists on the line so that a determination is made whether or not to permit detector 12 to scan the entire line. As more fully described herein, logic 21, upon sensing the lack of information initiates either a detector skip or a line step operation, depending upon whether or not further information exists on the line that detector 12 started to scan. If no information exists, a line step signal is generated and drum 20 is moved to the next scan line. Similarly, in printer 30, no printing heads are actuated and drum 40 is moved to the next scan line.

If for example, detector 14 detects further information on the line then logic 21 initiates a skip signal that skips the blank portion by actuating detector 13 and coupling the information sensed thereby to modem 25. Thus, detector 14 senses the presence of information in a given quarter of the line and detector 13 is then actuated to read out the information in that quarter. Drum 20 turns at a uniform rate, but by the action of logic 21 a quarter of a line has been skipped and the time that would normally be wasted in the scanning blank space is saved. A skip signal is coupled to printer 30 wherein logic circuit 41 decodes the skip signal to actuate the corresponding printing head, in this case printing head 33.

If no further information appeared in the line being scanned by detector 12, a line step signal is combined with a skip signal to cause one of detectors 15–17 to be actuated and have the output thereof coupled to modem 25. In this manner, a detector that is off the page at the time of the line step signal is selected so that no information is lost in the line stepping and space skipping operations. In order to avoid cumulative errors in positioning of the detectors relative to the page, as where there are many successive blank lines, it is desirable to index the page so that logic circuit 21 has an indication of where the page begins. This can be done in a variety of ways, perhaps the simplest of which is to include as part of the background to sheet 11 a dark stripe defining the initial edge thereof. In this way the first quarter of the page is always scanned and logic circuit 21 does not lose a sense of where the edge of the page is. Any other suitable mechanism may also be used for indicating to logic circuit 21 where the edge of page 11 lies.

It is to be understood that in the present example, a quarter of a page becomes the minimum block of space that can be skipped or read by virtue of there being eight detectors. Obviously, this space increases or decreases in proportion to the number of heads available. Further, it should be understood that while the present example utilizes an even number and hence that half of the heads are scanning the page while half are not, there is no requirement that the number of heads be divisible by two.

Figure 2:
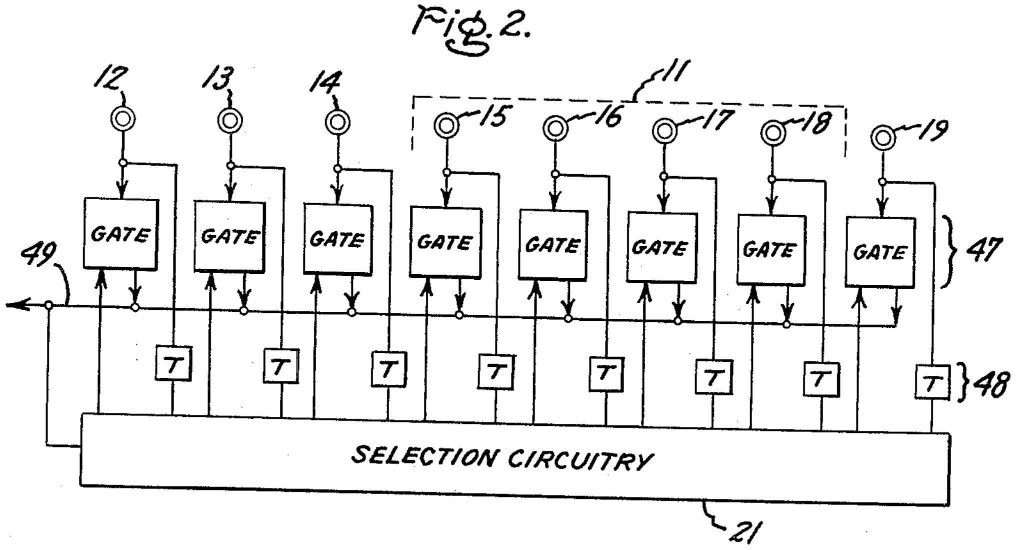
FIG. 2 illustrates a simplified logic circuit for use in the present invention.

FIG. 2 illustrates in simplified form logic circuitry suitable for use in the present invention. Specifically, detectors 12–19 have the outputs thereof connected to gate circuits collectively numbered 47 and to threshold detectors collectively numbered 48. The outputs from threshold detectors 48 provide the input to selection circuitry 21. It should be understood that threshold detectors 48 represent whatever signal processing is necessary to render the output of heads 12–19 compatible with the logic utilized. For example, where the output of the detectors is a small fraction of a volt, threshold detectors 48 may include an amplifier and clipping circuit to convert the non-zero, variable amplitude output signal to a digital signal, i.e., the logic 1 level is made uniform in amplitude.

As illustrated in FIG. 2, page 11 is scanned by detectors 15–18. Assuming detector 15 is selected by selection circuitry 21, gate 47, to which detector 15 is connected, is placed in an open condition so that the image data from detector 15 is coupled to output line 49.

During the time detector 15 is coupled to output line 49, detectors 16, 17, and 18 are monitored by selection circuitry 21 by way of their respective threshold detectors 48. The monitoring takes place over the interval defined by the time it takes detector 15 to scan a space on page 11 equal to the separation between detectors 15 and 16. If during this time interval, detector 16 has not detected information on the line, selection circuitry 21 will look ahead to see which of detectors 17 and 18 have detected information. Assuming detector 18 has detected information, then selection circuitry 21 actuates gate 47 connected to detector 17. In so doing, the information seen by detector 18 is scanned in the succeeding interval by detector 17. The blank space seen by detectors 16 and 17 is thereby omitted and the scanning of page 11 is appreciably advanced, electronically not mechanically.

If none of detectors 16–18 had seen information during the first interval of the scan by detector 15, then a line step signal is produced by selection circuitry 21 and applied to output line 49. When a detector is skipped, selection circuitry 21 also provides a signal to output line 49 indicative of the identity of the next detector to be selected.

Figure 3:
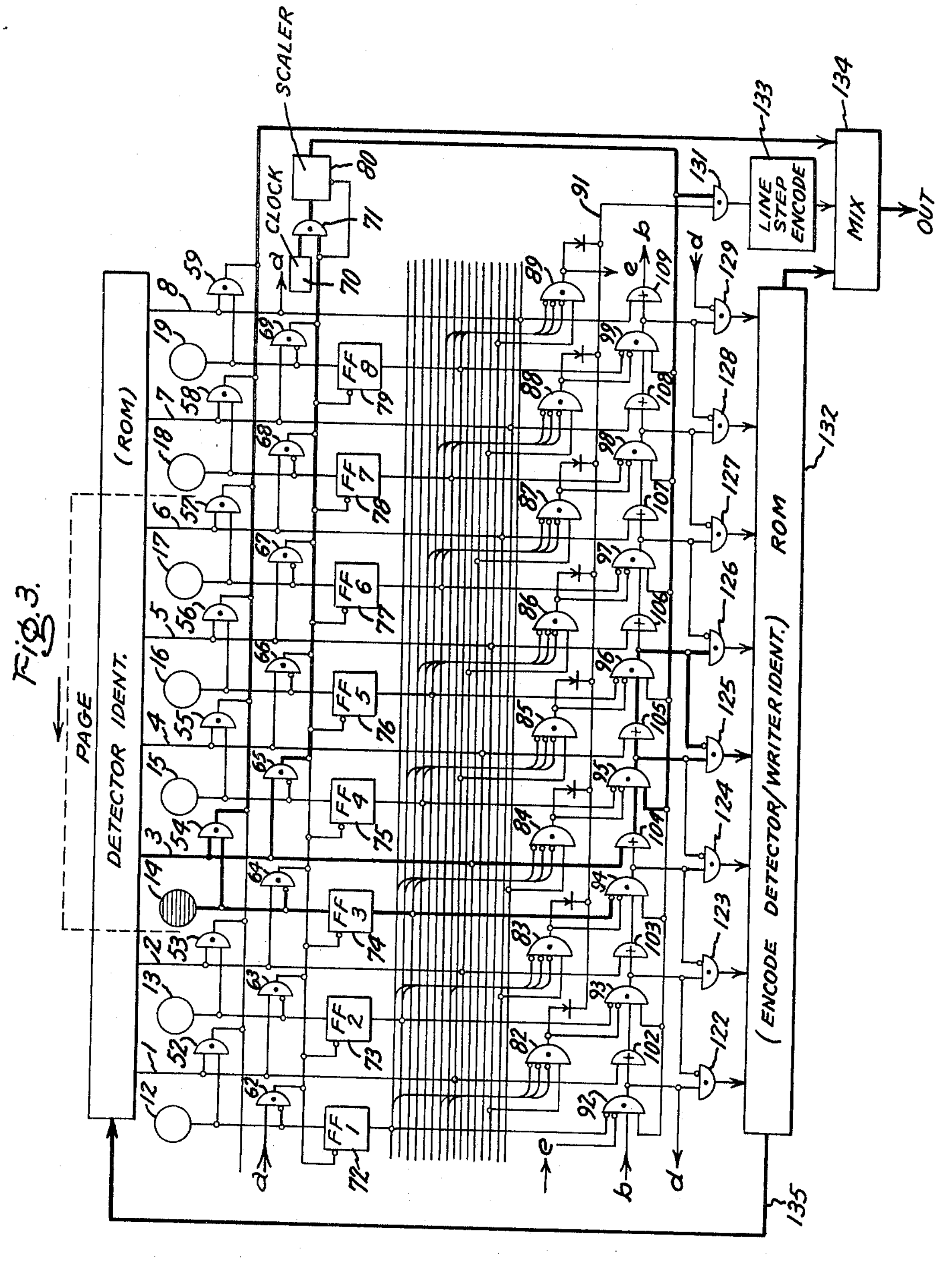
FIG. 3 illustrates a detailed logic circuit for use in the present invention and illustrates the detector skipping operation.
Figure 4:
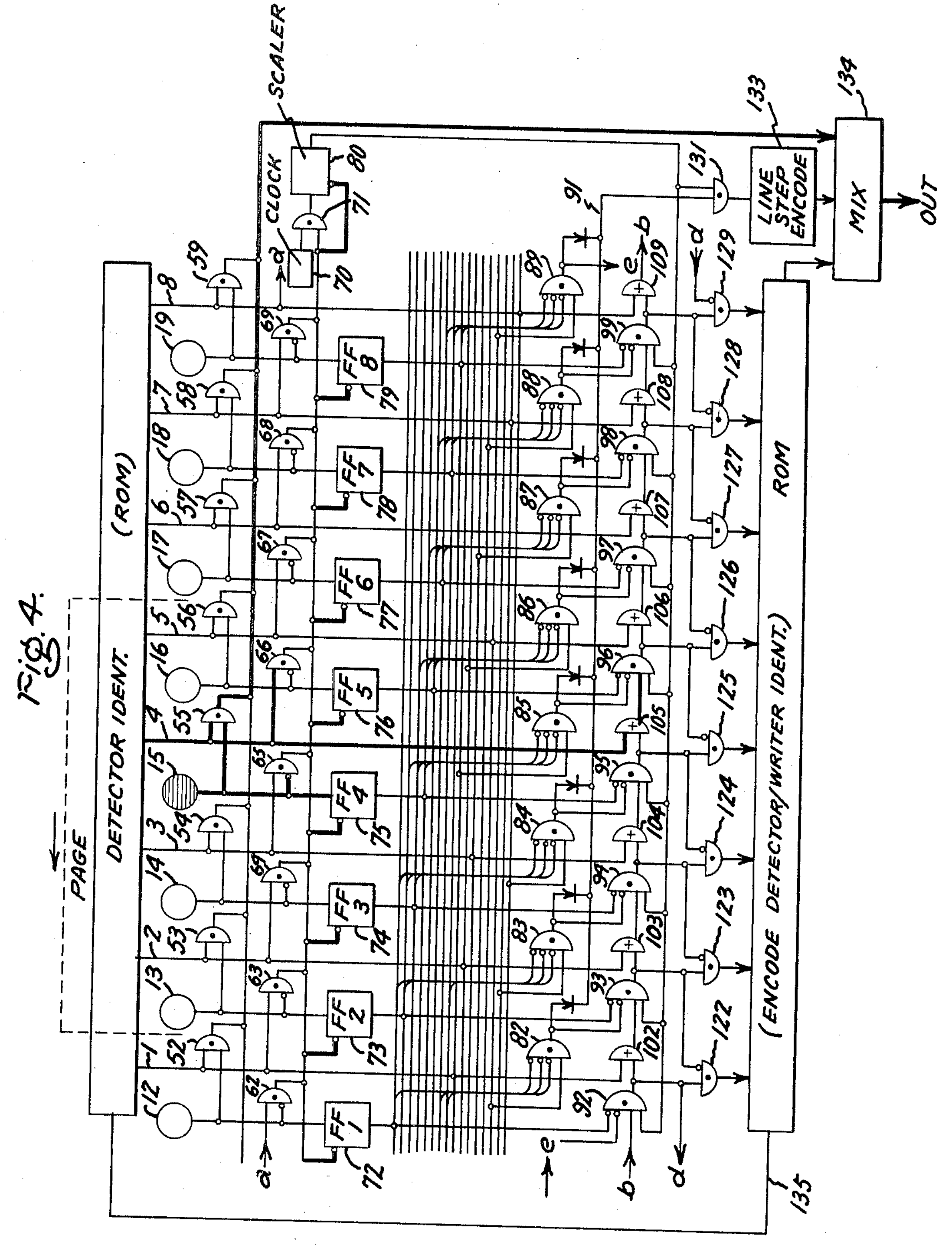
FIG. 4 illustrates the same logic circuit in which the scan operation proceeds without sense head skipping.
Figure 5:
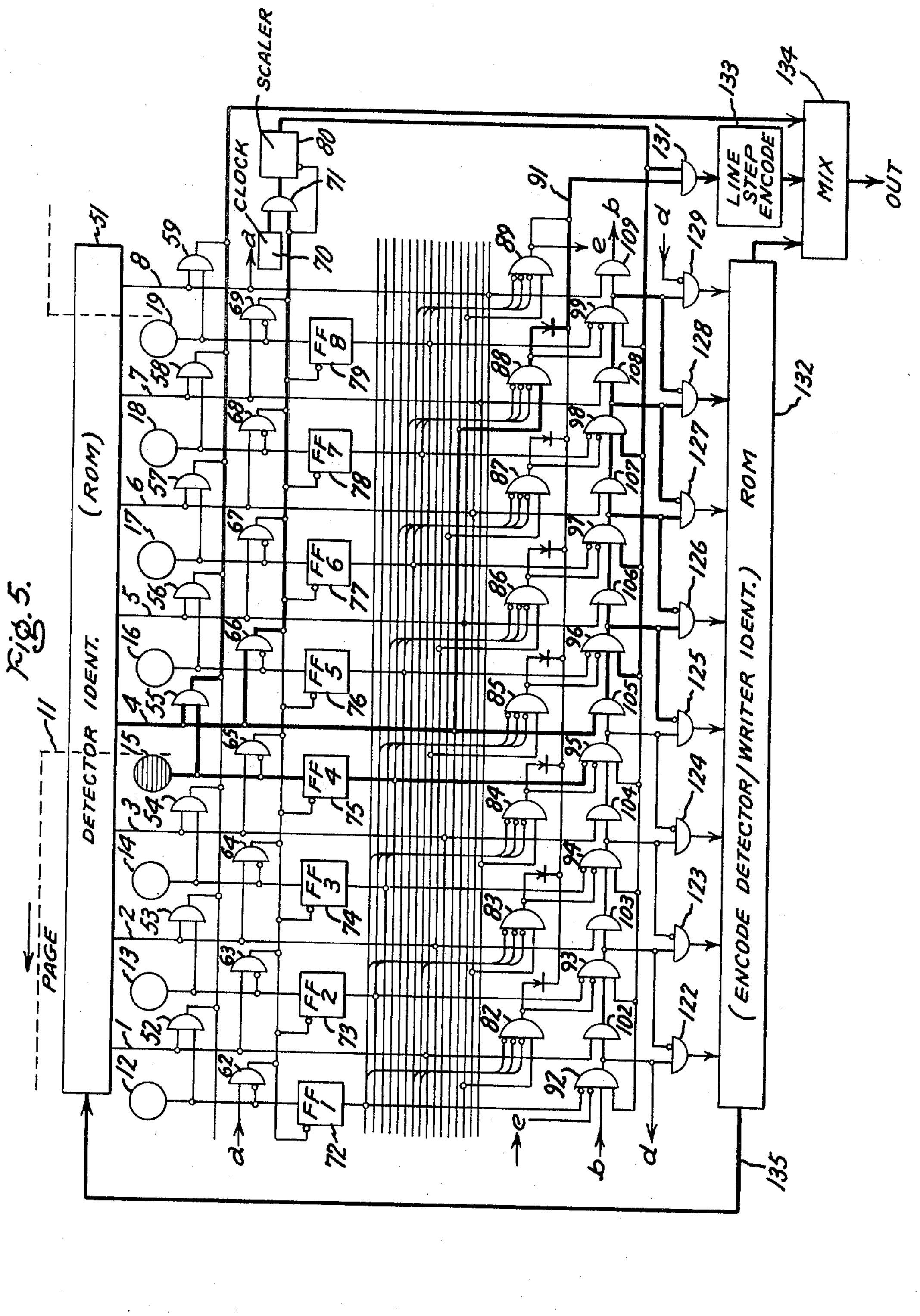
FIG. 5 illustrates the same logic circuit performing line step and head skipping operations.

A more complete understanding of the present invention can be obtained by considering the detailed logic diagram illustrated in FIGS. 3, 4 and 5. FIGS. 3, 4, and 5 illustrate the same logic diagram but with different interconnections emphasized to illustrate the operation of the present invention during different input conditions.

Specifically, page 11 is scanned by a plurality of detectors 12–19. The outputs of detectors 12–19 are coupled to AND gates 52–59 respectively, AND gates 62–69, respectively, and flip-flops 72–79 respectively. The outputs of flip-flops 72–79 are coupled to a matrix array in which connections are provided to a plurality of AND gates 82–89. The output of AND gates 82–89 are connected by way of a plurality of diodes to line 91. The outputs of AND gates 82–89 are also connected as one input to AND gates 93–99 and 92 respectively.

Interconnecting AND gates 92–99 are a plurality of OR gates 102–109, respectively. A plurality of AND gates 122–129 have the direct inputs thereof connected to the output of AND gates 92–99, respectively. AND gates 122–129 have the inverted input thereof connected to the output of AND gates 93–99 and 92, respectively. The outputs from AND gates 122–129 are coupled to read only memory 132 which serves as an encode detector/writer identification circuit. The output from read only memory 132 is connected to mixer 134 and to detector identification circuit 51.

The outputs of AND gates 62–69 are connected in common to the inverted, reset inputs of flip-flops 72–79 and as one input to AND circuit 71. The other input to AND circuit 71 is provided by a source of clock pulses 70. Connected to the output of AND circuit 71 is scaler 80. Scaler 80 has an inverted, reset input that is connected to the common line connecting the reset inputs of flip-flops 72–79. The outputs from AND circuits 52–59 are connected in common as one input to mixer 134. The output of scaler 80 is connected in common as one input to AND circuits 92–99 and 131. Output line 91 serves as the other input to AND circuit 131. The output of AND circuit 131 is connected to line step encoder 133, which in turn has its outout connected to mixer 134.

In general, the selection circuitry illustrated in FIG. 3 operates as follows: A single one of lines 1–8 is selected by detector identification circuit 51, which may for example comprise a read only memory. Assuming for example that line 3 has been actuated, gate 54 is opened thereby coupling the output from detector 14 to mixer 134 by way of the common output lines from AND circuits 52–59. This common output line carries the image data to mixer 134, then to modem 25 and printer 30.

The next level of AND gates, AND gates 62–69, are used to detect whether or not the next detector senses information within a given period of time determined by clock 70 and scaler 80. The frequency of the clock pulses emanating from clock 70 and the division ratio of scaler 80 are chosen so that a given detector has scanned the interval between itself and its nearest neighbor.

Since the other input to AND circuits 62–69 is an inverted input, the absence of information from the next detector provides a high output which enables AND gate 71, thereby passing clock signals from source 70 to scaler 80. If no information is seen within the predetermined period, scaler 80 is cycled through a complete count producing an output signal that is coupled to AND circuit 131 as well as and circuits 92–99.

The presence of an output signal from one of AND circuits 62–69 prevents flip-flops 72–79 from resetting. Thus flip-flop 72–79 provide a temporary storage of whether or not information is seen by detectors 12–19, respectively. The outputs from flip-flops 72–79 are used in the selection of the next detector to be actuated when one or more are to be skipped.

AND gates 92–99, OR gates 102–109, and AND gates 122–129 serve to select which of the detectors is to be actuated during the next scanning interval. The term "scanning interval" as used herein refers to that fraction of page 11, lying between one detector and the next. The row of AND gates designated 82–89 serve to look back at the end of each interval to determine whether or not information has been seen on the line being scanned. If information has been seen, the inverted inputs to gates 82–89 prevent the generation of an output signal on line 91. AND circuit 131 prevents the generation of a spurious line step signal when one or more of AND gates 82–89 are looking back over those detectors that are not scanning page 11. Thus, AND circuit 131 requires both a skip signal and a line step signal before a signal is applied to line step encoder 133. Thus the overall operation of the selection circuitry is to look ahead one or more detectors to determine whether or not information exists on a line and, if none exists, then the sense heads are stepped to the next line. If there are blank intervals, but the entire line is not blank, those intervals over which information is not detected are skipped.

As specific examples of the operation of the present invention, a detailed discussion of FIGS. 3, 4, and 5 follows in which FIG. 3 illustrates as an initial condition where the first detector senses information, the second detector does not, and the third and fourth detectors do sense information so that one interval must be omitted; FIG. 4 illustrates the operation of the present invention after one interval has been omitted and the remainder of the line contains information; FIG. 5 illustrates the operation of the present invention when the sensing head reach the end of the scanned line and must step to the next line.

Referring to FIG. 3, and assuming that as the initial condition detector 14 is starting from the lefthand edge of page 11, and further assuming that detectors 14, 16, and 17 will detect information in scanning the next one fourth of page 11 while detector 15 will not (as indicated by the small checks (  ) and *x* in FIG. 3), then data from detector 14 is coupled to mixer 134 by way of gate 54 which has been activated by a logic 1 on line 3.

During the interval wherein detector 14 scans the first quarter of page 11, detector 15 is scanning the second quarter. Since it has been assumed that detector 15 will not see any data in this interval, then the output from detector 15 is low. This low level logic signal is applied to gate 65 and flip-flop 75. Since the input to gate 65 from detector 15 is an inverted input, the low level input signal combined with the high level input signal from line 3 produces a high level output from AND gate 65. This high level output signal is coupled to AND gate 71 where it enables clock pulses from clock source 70 to be passed through gate 71 through scaler 80. As previously noted, the frequency of the pulses from clock source 70 and the division ratio of scale 80 are such that the scaler 80 will cycle through a complete count in the time it takes the detector to scan one quarter of page 11.

At the end of the interval defined by clock source 17 and scaler 80, an output pulse is produced from scaler 80 that is coupled to AND gate 131 and AND gates 92–99.

The logic gates in the row comprising AND gates 92–99 and OR gates 102–109 determine whether or not a detector should be skipped in the next interval. By virtue of flip-flops 72–79, temporary storage is provided of whether or not all the remaining sense heads detect information. This temporary storage, and the logic circuitry illustrated beneath, enable the system to determine how far to skip. The row comprising AND gates 122–129 determine which of AND gates 52–59 is actuated during the next interval.

In this particular case, the logic 1 output signal from flip-flop 74 is coupled to the inverted input of AND gate 94 thereby preventing a logic 1 output. However, the logic 1 signal on select line 3 is coupled through OR gate 104 to produce a logic 1 output signal at the output thereof. As previously noted, the output from flip-flop 75 is a logic 0 which is coupled to an inverted input of AND gate 95. The other inverted input of AND gate 95 is coupled to the output of AND gate 84. AND gate 84 looks back several detectors to determine whether or not data has been detected. In this particular case, a logic 1 signal from flip-flop 74 is coupled to an inverted input of AND gate 84 thereby preventing a logic 1 output signal. The logic 0 from AND gate 84 is then coupled to the other inverted input of AND gate 95. The logic 1 from select line 3 is coupled by OR gate 104 to a direct input of AND gate 95 and the logic 1 output signal from scaler 80 is coupled to the other direct input of AND gate 95. Thus the input logic levels for AND gate 95 are satisfied and AND gate 95 produces a logic 1 output.

This logic 1 output is coupled through OR gate 105 to a direct input of AND gate 96. Similarly, the logic 1 output signal from scaler 80 is coupled to the other direct input of AND gate 96. AND circuit 85 provides a logic 0 input level to one of the inverted inputs of AND gate 96. The remaining inverted input to AND gate 96 however is provided with a logic 1 by flip-flop 76. Thus the output level of AND gate 96 is a logic 0.

Having thus described the operation of the logic circuits, it will be apparent that a logic 0 is obtained at the outputs of AND gates 97–99, 92, and 93.

AND circuits 122–129 each have two inputs, one direct and one inverted. This arrangement enables one of AND circuits 122–129 to sense a transition from a logic 1 to a logic 0 at the outputs of AND circuits 92–99. As can be seen by inspection of FIG. 3, this transition occurs between AND gates 95 and 96. Thus the input logic level requirements of AND gate 125 are satisfied and AND gate 125 produces a output signal which is applied to read only memory 132. Read only memory 132 encodes this signal and applies it to mixer 134 for directing printer 30 to activate the appropriate selection line. Read only memory 132 also has an output 135 coupled to detector identification circuit 51. This output may either be encoded or direct, but in either event the output signal on line 135 directs detector identification circuit 51 to actuate selection line 4 instead of selection line 3. In so doing, detector 15 is coupled to mixer 134 with the result that one quarter of the page, containing blank space, is skipped over.

The logic 1 signal from scaler 80 that is also coupled to AND circuit 131 does not produce any output from AND circuit 131 since output line 91 has a logic 0 thereon. As can be seen by inspection, AND gates 82–89 have as a direct input thereto a connection to one of the lines connected to selection lines 1–8. In the specific example illustrated in FIG. 3, only selection line 3 has been actuated and only AND gate 87 is coupled to selection line 3. Thus the only AND circuit having a possibility of providing a logic 1 output is AND gate 87. However, AND gate 87 looks back at the outputs of flip-flops 75–77 and sees a logic 1 signal on both flip-flops 76 and 77. Since these signals are coupled to the inverted inputs of AND gate 87 a logic 0 output signal is produced.

FIG. 4 illustrates detector 15 reading the remainder of the line after skipping the second quarter. As detector 14 finishes scanning the first quarter of page 11, detector 15 is positioned just before the start of the third quarter of page 11. Thus when detector 15 is selected by a logic 1 signal on line 4, the second quarter of page 11 is in effect skipped over. Since it has been assumed that information exists in the remaining two quarters, then detectors 15 and 16 will continue to see information.

The logic 1 signal on line 4 actuates AND gate 55 and AND gate 66. The data detected by detector 15 is therefore coupled through gate 55 to mixer 134. Detector 16 provides a high level input signal to the inverted input of AND circuit 66. Thus the output of AND circuit 66 is a logic 0 which fails to enable AND circuit 71. However, the logic 0 is coupled to the reset input of scaler 80 and the reset inputs of flip-flops 72–79. Thus these devices remain in the reset state and produce a logic 0 at the outputs thereof.

No detector skip signal is generated since the output signals from AND gates 92–99 are logic zeroes. The logic 1 signal on select line 4 is coupled through OR gate 105 to one of the direct inputs to AND gate 96. The output of flip-flop 76 and AND gate 85 are logic zeroes which are coupled to the inverted inputs of AND gate 96. However, the output from scaler 80 is a logic 0, coupled to a direct input to AND gates 92–99, thereby maintaining the outputs of these gates at a logic 0.

A line step signal can only be generated by AND gate 88 since it alone is connected in the matrix to select line 4. AND gate 88 looking back three flip-flops sees a zero logic level at the output of flip-flops 76–78. Thus the logic level requirements of AND gate 88 are satisfied and a logic 1 signal is produced on common output line 91. However, this logic 1 is blocked by AND gate 131 from actuating line step encoded 133, since the output from scaler 80 is a logic 0. Thus detector 15 is committed to scan the remainder of the line to the edge of the page portion with no further skipping of portions of the line.

FIG. 5 illustrates the situation where detector 15 reaches the edge of the page and a line step signal should be generated. At the time of the generation of a line step signal, it is also necessary to select which detector is to be actuated to insure that the next line is scanned from one end to the other for data. This is accomplished simultaneously by the line step logic circuitry, comprising AND gates 82–89, and the detector skip circuitry comprising AND gates 92–99, 122–129, and OR gates 102–109.

As with FIG. 4, select line 4 has a logic 1 signal thereon thereby activating AND gates 55 and 66. Detector 15 is coupled by AND gate 55 to mixer 134 thereby providing the image data output signal from the scanner. At the start of the scan of the last quarter of page 11, detector 16 moves off the page to the blank background, thereby producing a logic 0 output signal. This logic 0 output signal is coupled by way of gate 66, which has been turned on by the logic 1 signal on select line 4, and enables AND gate 71 to pass clock signal from clock source 70 to scaler 80.

When detector 15 reaches the edge of page 11 as illustrated in FIG. 5, detector 16 will not have seen information for a period equal to the scan of one quarter of a page. Thus scaler 80 will cycle through a complete count producing a logic 1 output signal which is coupled to AND gate 131 and AND gates 92–99.

As previously noted, two tasks must be carried out: a line step signal must be generated and the proper detector must be selected for the beginning of the next scan. The line step signal is generated by AND gate 88 which has its direct input connected to select line 4.

AND circuit 88 looking back at flip-flops 76–78 sees only logic 0 levels since the detectors coupled to the inputs of these flip-flops are scanning background and not information. Thus, the logic level input requirements of AND gate 88 are satisfied and a logic 1 output signal is provided. This logic 1 output signal is coupled by way of common output line 91 as the other direct input to AND gate 131. This time however both inputs to AND gate 131 are at the proper level and an output signal is generated to actuate line step encoder 133. The line step signal is coupled to mixer 134 from where it is transmitted to the printer.

The proper detector to be selected for the next scan is determined as follows: a logic 1 signal on select line 4 is coupled by way of OR gate 105 to one of the direct inputs to AND gate 96. It can be seen by inspection that the outputs of AND gates 92–95 are logic zeroes. The output of AND gate 96 however is a logic 1 due to the logic 1 inputs from AND gate 105 and scaler 80 and the logic 0 inputs from AND gate 85 and flip-flop 76. This logic 1 output signal is coupled by way of OR gate 106 to a direct input of AND gate 97. The other direct input to AND gate 97 has a logic 1 signal applied thereto from scaler 80. The inverted inputs are connected to a logic 0 signal from AND gate 86 and a logic 0 signal from flip-flop 77. Thus the output of AND gate 97 is a logic 1 which is coupled by way of OR gate 107 to a direct input of AND gate 98. In similar fashion, the output of AND gate 98 is a logic 1 which is coupled by way of OR gate 108 to a direct input of AND gate 99. The output of AND gate 99 however is a logic 0 due to a logic 1, from AND gate 88, being applied to an inverted input. This logic 1 is the line step signal generated as described above. Thus from AND gate 98 to AND gate 99 is a transition from a logic 1 level to a logic 0 level.

This transition is looked for by AND circuits 122–129, and the input conditions are satisfied only for AND gate 128. Thus the appropriate select line is identified by read only memory 132 and its identification is applied to mixer 134 for transmission to the printer. Similarly, the identification is sent by way of output line 135 to detector identification circuit 51. In this particular instance, select line 7 is enabled thereby coupling detector 18 to mixer 134. As can be seen from FIG. 5, detector 18 is positioned well in advance of the leading edge of page 11 so that upon changing to the next line no data is lost.

Should a line step signal be generated well in advance of the edge of page 11, because no data exists on the line for example, then the logic circuitry will select a detector that is approximately half way around on drum 20 as the starting detector for the next line. The detector skipping logic circuitry will then again be reactivated after the scan of a quarter of the page to select the appropriate detector for scanning the new line. Thus it is always assured that no information will be omitted in the combined operations of line stepping and detector skipping.

Figure 6:
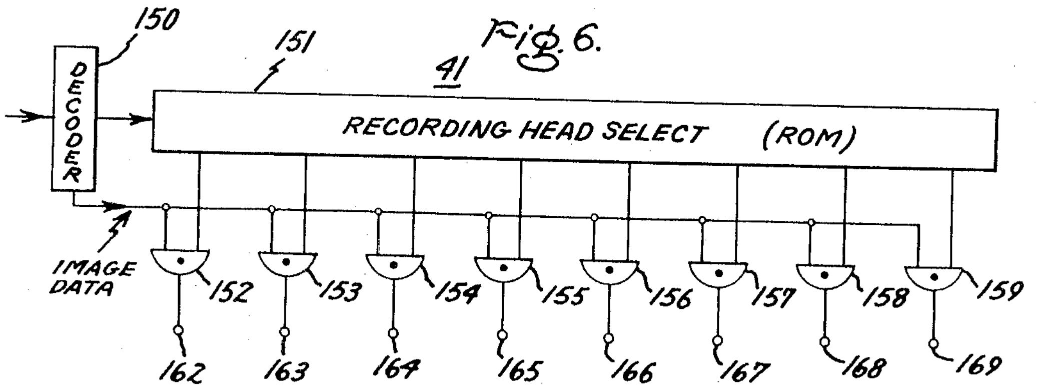
FIG. 6 illustrates a printer suitable for use in the present invention.

FIG. 6 illustrates in detail the components of logic circuit 41 as used in the printing half of the facsimile system of the present invention. The output signal from mixer 134 is applied to modem 25 and transmitted over any suitable transmission link to modem 45 where it is received. The signal from modem 45 is coupled by way of rotating transformer 42 to the input of decoder 150. Decoder 150 serves to split the signal into its component parts for suitable actuation of drum 40.

The detector identification signal from read only memory 132 is applied to recording head selection circuitry 151. Recording head selection circuitry 151 provides an output signal at only one of its output lines to enable one of AND gates 152–159. The image data is separated by decoder 150 and applied in parallel to AND gates 152–159. Only that AND gate having both signals at the input thereof couples the image data signal to its output. At the output of each of AND gates 152–159 are printing heads 162–169, respectively. Thus the image data is printed at the appropriate location by the head selected by selection circuitry 151.

Printing heads 162–169 may comprise any suitable mechanism, such as, but not limited to, wire discharge, thermal or impact (hammer) printers. Similarly, any suitable mechanism may be used to provide the line step function for drums 20 and 40. Such mechanical devices are well known in the art, form no part of the present invention, and need not be detailed here. Mixer 134 may comprise any suitable multiplexing circuit or may in fact even be omitted and three separate lines run from scanner 10 to printer 30.

There is thus provided by the present invention a facsimile system in which the mechanical simplicity of fully scanning systems is combined with the time saving capability of much more elaborate blank space skipping systems.

Having thus described the present invention it will be apparent to those of skill in the art that various modifications can be made within the spirit and scope of the present invention. While described in conjunction with optical sensors for detecting information on a page by variations in reflectance, the present invention may be used with any type of sensor producing a suitable output signal, i.e., compatible with the logic circuitry; for example, a magnetic sensor. Further, as noted above, the number of sense and printing heads may be set at any desired figure, for which the number of inverted inputs to AND gates 82–89 would be adjusted accordingly.

What we claim as new and desire to secure by Letters Patent of the United States is:

1. A facsimile system for scanning a document at one location and reproducing the information contained therein at another location comprising:
- a plurality of sense heads for detecting information;
- rotatable carrier means having said heads distributed approximately uniformly about the periphery thereof, said rotatable carrier means rotating at approximately constant speed to cause at least two of said plurality of heads to scan different segments of a line of said document simultaneously;
- transmitting means for transmitting data to said other location;
- first logic means coupled to said sense heads for selectively connecting one of said sense heads to said transmitting means; and
- second logic means coupled to said sense heads and said first logic means for electronically increasing the scan rate by detecting blank segments and causing said first logic means to selectively connect a different sense head to said transmitting means.

2. A facsimile system as set forth in claim 1 and further comprising:

a plurality of printing heads for printing information, the number of said printing heads equalling the number of said sense heads;

receiving means at said other location for receiving data from said one location; and printing logic means interconnecting said receiving means and said plurality of printing heads for selecting a single printing head to cause the information detected by said one of the sense heads to be printed.

3. A facsimile system as set forth in claim 2 wherein said second logic means comprises:

timing means coupled to said sense heads for detecting blank segments of predetermined length in said document;

sense head skipping means coupled to said timing means for generating a signal indicative of a predetermined amount of blank space; and sense head indentification means coupled to said skipping means and said gate means for generating a selection signal indicative of the next sense head to be coupled to said output line.

4. A facsimile system as set forth in claim 3 and further comprising:

line step sensing means coupled to said first and second logic means for generating a line step signal upon the detection of all information in a given line scan.

5. A facsimile system as set forth in claim 3 wherein said first logic means comprises:

gate means for coupling a selected one of said sense heads to an output.

6. A facsimile system as set forth in claim 3 wherein said sense heads comprise optical detectors sensitive to variations in the reflectance of said document.

7. A facsimile system for scanning a document at one location and reproducing the information contained therein at another location comprising:

rotating sense means, including a plurality of spaced sense heads, for scanning said document in a plurality of scan lines, said sense means dividing each scan line into a plurality of intervals determined by the distance between successive sense heads, said sense means rotating at relatively constant speed;

an output for coupling facsimile signals from said sense means;

first logic means coupled to said sense heads for passing facsimile signals from one of said sense heads to said output; and second logic means connected to said sense heads and said first logic means for detecting blank intervals and causing said first logic means to skip said blank intervals to electrically increase the rate of scan while maintaining said rotating speed constant.

8. A facsimile system as set forth in claim 7 and further comprising:

third logic means, coupled to said sense heads and said first logic means, for detecting the scanning of all of the information in a scan line and causing said heads to step to the next line to be scanned.

9. A facsimile system as set forth in claim 8, wherein said sense heads are optically sensitive to variations in the reflectance of light from said document.

10. A facsimile system for scanning an original and reproducing the information contained therein at another location comprising:

a member having a plurality of sense heads spaced approximately uniformly about the perimeter thereof and rotating at constant speed;

logic means coupled to said heads for sensing blank spaces in said original and selecting a different head for readout to electronically advance said scan across said blank spaces while maintaining constant rotational speed;

a plurality of printing head means, one for each of said sense heads; and means for causing the corresponding head to print information detected by a sense head.

* * * * *